Aug. 6, 1963

W. J. O'CONNOR 3,100,253

TEMPERATURE CONTROL SYSTEM FOR SPECIMEN TESTING

Filed Oct. 7, 1958

INVENTOR
Walter J. O'Connor

INVENTOR
Walter J. O'Connor

United States Patent Office 3,100,253
Patented Aug. 6, 1963

3,100,253
TEMPERATURE CONTROL SYSTEM FOR
SPECIMEN TESTING
Walter J. O'Connor, Grove City, Pa., assignor to Satec Corporation, a corporation of Pennsylvania
Filed Oct. 7, 1958, Ser. No. 765,861
4 Claims. (Cl. 219—20)

This invention relates to apparatus and method for temperature control by electrical means in the testing of conductive specimens whether made of metal or other materials. More particularly, my invention relates to mechanism and method for tension, or creep, tests upon such specimens at selected elevated temperatures.

Heretofore, in a prevalent practice for determining the tensile strength, creep characteristic, or other property of a material such as a metal at elevated temperature, a relatively separate furnace has been used with electric heating coils therein to surround and heat the specimen during the test. Such an arrangement is cumbersome, costly, makes it difficult to handle and observe the test apparatus and specimen and to conduct the test when desired in a selected atmosphere. Further, such indirect heating of a specimen lags time-wise and is relatively hard to control, all of which is detrimental to the testing and the accuracy of the determination being sought. In addition, a suggestion has been made in United States Patent No. 2,685,-195 for the direct heating of a specimen by connecting it to a suitable source of current without, however, any disclosure whereby such heating may be prevented from "running away," or be automatically controlled, particularly when it is desirable to hold the specimen rather closely to the selected test temperature. And, upon any rupture of a specimen directly heated in that way, detrimental arcing would normally occur across the break.

In the new temperature control system of my invention, the foregoing difficulties and deficiencies have been overcome and the selected testing temperature can be rapidly achieved and closely held. Thus, in my invention an electrically conductive specimen is heated directly by being connected across both the secondary and the primary windings of a transformer and material arcing upon any rupture of the specimen is suppressed, which in turn means that the pieces of the specimen can be accurately fitted together for measurement of the elongation which has taken place and that the crystalline structure of the fractured cross section remains for any composition or other study thereof desired. In addition, fine heat and close temperature control are obtainable during testing by automatic regulation of the permeability of the core of such transformer in self-compensation for changes in the resistance of the specimen in the course of such heating and for any change in the cross section thereof that may occur. Still further, my new system includes means for maintaining the specimen surrounded by an inert or other desired atmosphere without introducing weight masses of a kind for which it would be difficult to make due allowance. In some situations, it may be desired to control the velocity of selected fluid flow past a specimen during testing at controlled temperature, or to have such testing performed under vacuum conditions, and embodiments of my system enable such to be accomplished readily in a highly practical manner.

Other objects, features and advantages of my invention will be apparent from the following description and the accompanying drawings, which are illustrative only, in which FIGURE 1 is a side view of one form of creep and rupture test mechanism constituting one embodiment of my invention;

Figure 2:
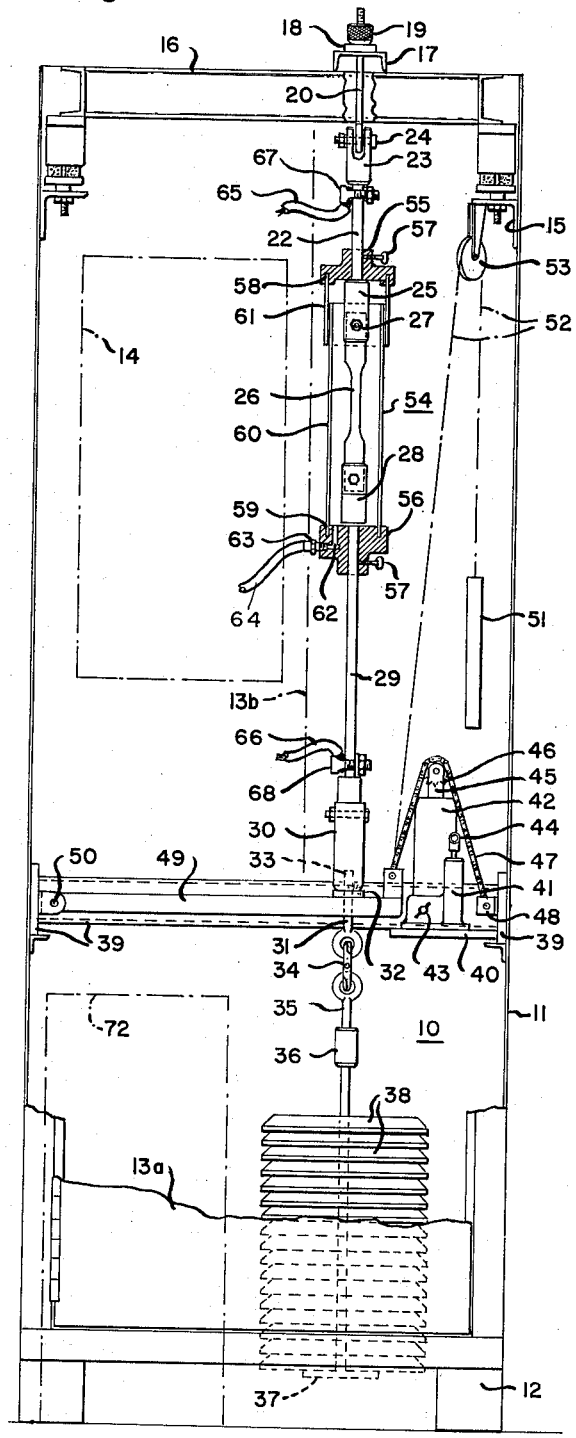
FIGURE 2 is a view of the embodiment shown in FIGURE 1 taken along line II—II of FIGURE 1.
Figure 1:
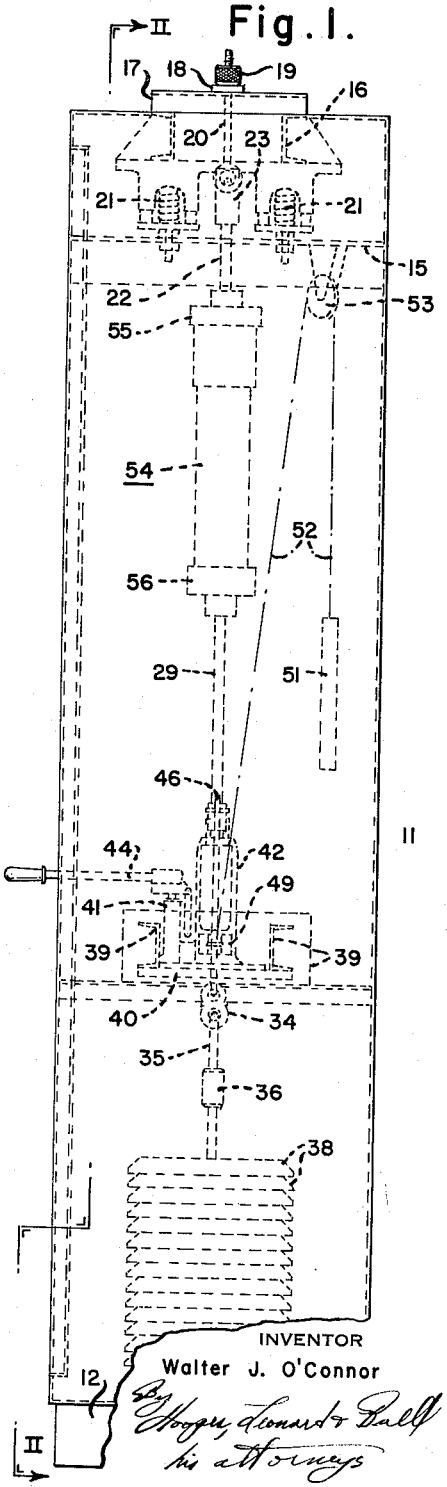

Referring to FIGURES 1 and 2 of the drawings showing a creep and rupture test machine embodiment 10 of this invention, there is therein a cabinet 11 on a hollow base 12, the cabinet being provided with a lower half full width front door 13a and an upper half partial width door 13b having a panel portion 14 also shown in chain line outline which may act as an instrument panel with appropriate instruments attached thereto. Brackets 15 along each side of the cabinet 11 support a suspension frame 16 having a cross member 17 for an upper suspension bearing 18 maintained in place by a nut 19 which engages threads at the upper end of an upper suspension eye bolt 20. Spring pads 21 may be provided between frame 16 and brackets 15 to inhibit vibratory disturbance of a testing operation.

An upper pull rod 22 is provided with a clevis 23 holding a knife edge bar 24 supported by the eye of rod 20. The lower end of pull rod 22 is fitted with an adapter 25 having a slot therein for the reception of the upper end of a test specimen 26. A bolt 27 passing across such slot and through an appropriate hole in the upper end of specimen 26 rigidly clamps the upper end of such specimen to adaptor 25 and rod 22. The lower end of specimen 26 is held in the same manner by a lower adapter 28 rigidly fastened to a lower pull rod 29. The lower end of rod 29 is bolted to the upper end of a coupling 30 into which a lower support eye bolt 31 extends in threaded engagement at 33 with the bottom thereof. A bearing 32 is interposed between the bottom of coupling 30 and a pivoted boom 49. Such bearings 18 and 32 enable a specimen to be more readily mounted or removed. The eye of bolt 31 is connected by a link 34 to an eye bolt 35 fastened in turn by a threaded coupling 36 to a weight pan 37 on which a selected number of load weights 38 are placed suitable to the particular testing operation.

A cross frame 39 is rigidly fastened in cabinet 11 and provided with a shelf 40 on the right-hand side. An hydraulic pump 41 and lift cylinder 42 with a relief valve 43 are mounted on shelf 40 so that when a handle 44 is pumped, plunger 45 will rise lifting a sprocket 46 rotatably mounted in the upper end thereof. Sprocket 46 is in engagement with a chain 47 the right-hand end of which is anchored at 48 to frame 39 and the left-hand end of which is fastened to the right-hand end of the boom support 49. The left-hand end of boom 49 is pivotally secured at 50 to the left-hand end of frame 39. Hence, with pan 37 loaded, boom 49 can be raised into position so that a specimen 26 may be affixed to the adaptors 25 and 28. With the specimen rigidly connected to the pull rods 22 and 29, relief valve 43 may be opened lowering plunger 45 and boom 49 beneath the bottom of coupling 30 a sufficient distance for the accomplishment of the particular testing desired. Boom 49 is preferably left close to, although spaced from, the bottom of coupling 30 during testing so that it will be quickly re-engaged, for example, upon any rupture of specimen 26 thereby preventing the weights 38 from dropping any material distance or causing any damage. A counterweight 51 may be provided and connected by a cable 52 passing around a sheave 53 connected to the right-hand end of boom 49 to offset a portion of the weight thereof.

In the testing of certain kinds of specimens, particularly those of a ferrous nature, the maintenance of the specimen at elevated temperatures is ofttimes detrimental to the accuracy of the test because of the formation of scale. In the embodiment illustrated in FIGURES 1 and 2, a shield 54 is provided by means of which the specimen may be kept bathed in an inert gas atmosphere. Shield 54 comprises an upper collar 55 and a lower collar 56 having a central opening therethrough for the passage of the respective pull rods. A set screw 57 may be used to fasten each such collar to said respective pull rods and the facing sides of the collars in question may if desired seat against the shoulders provided by the outer ends of the adaptors 25 and 28. A cylindrical groove 58 and 59 respectively is provided in each of the collars of respectively differing diameters. Groove 59 is fitted with a cylindrical shield 60 which may be of high temperature glass, or quartz, or other suitable material, the upper end of which is in telescoping relation with a shield portion 61 of like material fastened in groove 58 by cement or other means. If specimen 26 elongates in the course of testing, the shield portions will move relative to one another without contact. A port 62 formed in collar 56 has a fitting 63 for attachment to a flexible hose 64 through which an inert gas, such as nitrogen, may be pumped during the testing of a specimen 26 requiring such protection, such gas exhausting through the small annular passage between the overlapping edges of the shield portions 60 and 61. Preferably, the central openings through the collars 55 and 56 around the pull rods are sufficiently close to prevent material leakage of inert atmosphere at those points but if not, washers may be inserted between the inner faces of the respective collars and the adjoining shoulders of the respective adaptors to prevent such leakage.

The heating of the specimen 26 to the predetermined temperature at which the test is to be conducted is done directly as disclosed herein. Thus, insulated lead wires 65 and 66 with the conductor ends exposed are clamped by the respective U-clamps 67 and 68 against the pull rods 22 and 29, such pull rods being relatively large in cross section and of metal so that there is substantially no resistance therein or heating thereof which takes place during an operation.

Figure 3:
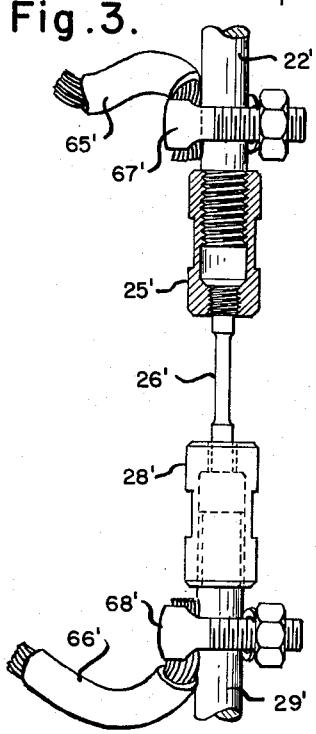
FIGURE 3 is a view somewhat enlarged of another form of specimen and mounting thereof which may be used in the illustrated embodiment of FIGURES 1 and 2.

The specimen 26, as shown, is a flat strip specimen. Such specimens may take many forms and in FIGURE 3 a round metal specimen 26′ is shown having enlarged threaded ends held respectively by upper and lower adapters 25′ and 28′. The outer ends of such adapters are also internally threaded for engagement with the respective threaded ends of upper and lower pull rods 22′ and 29′, respectively. Insulated conductors 65′ and 66′ are fastened closely adjacent the respective adaptors by U-clamps 67′ and 68′. All like numbered parts in the FIGURE 3 illustration correspond in functioning to the like numbered elements in FIGURES 1 and 2. In the case of the specimen 26′, no shield is required either because of the temperature at which the test is conducted, or because of the composition of the specimen 26′, or for other reasons.

Figure 4:
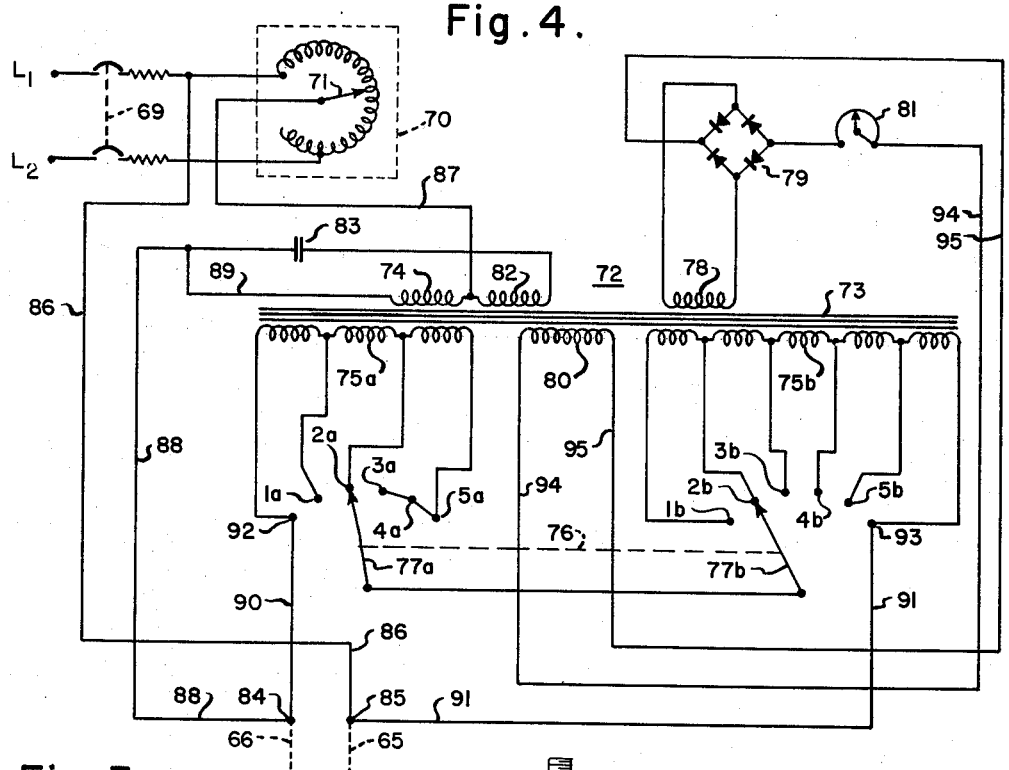
FIGURE 4 is a circuit diagram which may be utilized for the automatic self-regulating temperature control of embodiments of this invention.

Direct precise heating of the specimen 26, or specimen 26′, may be readily accomplished by the use therewith of a circuit such as the one schematically shown in FIGURE 4. Therein, a commercial source of alternating current single-phase power is available at the terminals $L_1$ and $L_2$. A circuit breaker 69 may be provided in the power lines and an auto transformer 70 connected thereto to act as a variable input voltage selector with the aid of a movable contact 71. A step-down transformer 72 having a magnetic core 73, a primary winding 74 and a secondary winding with distributed portions 75a and 75b are provided. Primary winding 74 may be furnished with a distributive winding 82 and a capacitance 83 in parallel therewith to smooth out voltage changes. The transformation and thereby the heating obtainable is made adjustable in the first instance by an interconnected tap changer 76 having movable contact arms 77a and 77b to move respectively between the taps 1a to 5a, inclusive, on one side and 1b to 5b, inclusive, on the other side. A further secondary winding 78 is provided and connected through a full-wave rectifier 79 to a direct current coil 80 in linked relation to core 73. A vernier rheostat 81 is provided in the direct current portion of the circuit. The lead conductors to the specimens are respectively connected to terminals 84 and 85.

In operation, the arms 71 and 76 are set respectively for the desired input voltage and secondary current suitable for the selected specimen to raise it to the predetermined temperature at which the test is to be conducted as in the case of a creep and rupture test on machine 10. The output wires 86 and 87 from selector 70 are connected across primary winding 74 through the specimen and wires 88 and 89 when the respective ends of a specimen are connected across the terminals 84 and 85 by the lead conductors 64 and 65, thereby placing the test specimen in series with the primary winding of transformer 72. At the same time, the specimen is also connected in series by the wires 90 and 91 to the transformer secondary winding terminals 92 and 93 placing the specimen across the selected portion or whole of the secondary winding 75 depending upon the position of the changer 76.

As the specimen relatively rapidly heats up to its test temperature chiefly because of the heating effect of the materially larger secondary current of transformer 72, a coarse balance is achievable due to the characteristics of the circuit and test specimen; that is, as the test specimen heats up, its electrical resistance rises tending to reduce the secondary current and thereby the product of the ampere-turns in the secondary. In addition, such increased resistance in the specimen also appears to produce some drop across the primary winding, with the result that a rough temperature control balance is achieved of a relatively broad band character. Then, as the temperature of the specimen tends to fall due to its thermal head relative to its surroundings, the reverse transformation action takes place as more current will flow in the secondary winding and through the specimen as its resistance goes down and the primary voltage across the primary winding 74 goes up inducing a correspondingly greater voltage in the secondary. Thus, the selection of the appropriate setting on the tap changer 76 for the secondary winding 75 will produce a back and forth "shuttling" of the temperature to each side of the desired index temperature for test with the peaks and valley bottoms of the shuttling being within a balance zone which may be termed a broad band temperature control.

For practical purposes, a finer control in the form of additional narrowing of the temperature control band is desirable and provided in the circuit by regulating the permeability of the magnetic core 73 by means of a direct current coil 80 responsive to alternating voltage induced in coil 78, constantly rectified by rectifier 79 and fed to coil 80 through rheostat 81 and wires 94 and 95. The setting of rheostat 81 reduces the extremities of the swings in the transformer currents passing through the specimen and thereby of the temperature to a narrower balance zone which may be termed the narrow band temperature control relatively close to the precise index temperature at which it is desired to carry out the test. Thereby, the field exerted by the linking flux of the transformer core is regulated relatively precisely for the restoration of balanced conditions to maintain the test temperature despite changes in the resistance of the specimen due to temperature changes, or ambient fluid effect, or a change in the cross section of the specimen in the course of any elongation or "necking" thereof that may occur before rupture if the test is permitted to proceed to rupture. For example, the rectifier output is connected to coil 80 by wires 94 and 95 and as the secondary current, or both the primary and secondary curents where the primary current is significant relative to the secondary current, falls below a value at which the desired temperature is produced by electrical resistance heating in the specimen, the effect of coil 80 will be to reduce the reluctance of core 73 just enough to raise the flux density and thereby the induced voltage to increase the current through the specimen to a somewhat higher value to quickly restore the specimen to test temperature. Conversely, as the current flowing through the specimen tends to go above the temperature control value, the coil 80 lowers the permeability of core 73 just enough to restore the balance and thereby the prescribed temperature. Further, if the test is permitted to proceed to rupture, both the primary and the secondary circuits of transformer 72 are instantaneously interrupted without the production of detrimental counter e.m.f. and arcing current. As a consequence, a ruptured specimen section at the rupture has the fracture form preserved for accurate measurement of elongation and necking and the crystalline structure protected for such metallographic or other study of the composition structure as may be desired. As will be understood by those having skill in the electrical arts to which this invention is disclosed, the circuit illustrated in FIGURE 4 may be modified in a number of ways within the principles which have been described.

Figure 5:
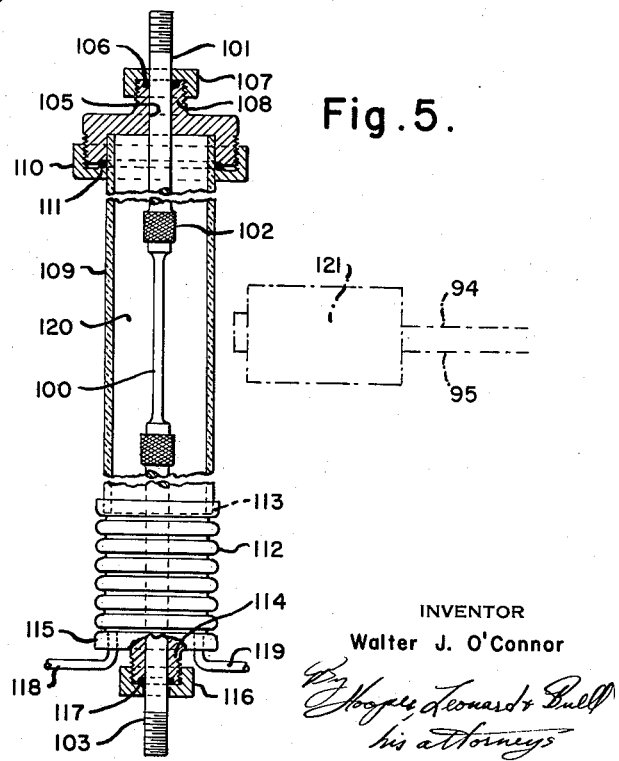
FIGURE 5 is a modification of the specimen mounting and shielding portion of the embodiment shown in the preceding figures suitable for use under fluid pressure or vacuum conditions selected for the testing of a specimen.

The further embodiment shown in part in FIGURE 5 may be utilized in the testing of a specimen 100 under preselected pressure or vacuum conditions. Therein, an upper pull rod 101 is connected to the upper end of specimen 100 by an adaptor 102 generally of the nature of adaptor 25' and the lower end of the specimen is similarly connected to a lower pull rod 103. The outer threaded ends of the pull rods may be connected in a machine such as that illustrated in FIGURES 1 and 2 for testing of the specimen 100. A collar 104 is provided with a central opening 105 through which rod 101 extends and is sealed by means of an O-ring 106 compressed by a cap 107 in threaded engagement with a central boss 108 on that collar. Collar 104 is provided with a cylindrical recess fitting closely around the upper end of a quartz tube 109, or the tube 109 may be of strength metal where the test in question is to be conducted under extreme pressure conditions at which the fluid, be it gas or liquid is supplied to the interior of cylinder 109. A screwdown ring 110 threadably engages the outside of collar 104 and compresses an O-ring 111 to seal the space between the collar and the upper end of cylinder 109. A flexible fluid-tight bellows 112 is provided with an upper cylindrical recess 113 to seat the lower end of cylinder 109, such lower end being affixed in the case of a quartz cylinder by a suitable cement so as to be leakproof. The lower end of bellows portion 112 is provided with a central boss 114 on a head 115 having a central opening therethrough for rod 103. A cap 116 threadably engages boss 114 and compresses O-ring 117 to seal the space inside cylinder 109 and bellows 112 from the outside thereof. Inlet and outlet pipes 118 and 119 respectively may be provided through head 115 and connected to suitable valves and pipes as may be required. In a pressure operation, liquid or gas at the selected pressure may be circulated through space 120 within cylinder 109 and bellows 112 through the pipes 118 and 119. Or, one of such pipes may be shut off and a vacuum pump attached to the other to exhaust the space 120 to the desired extent.

Where cylinder 109 is of a transparent or translucent character, a sensing or a sensing and indicator instrument 121 may be used and have the output terminals thereof connected respectively to wires 94 and 95 as an additive control for the regulation of the permeability of core 73 based upon the radiation from specimen 100. Thus, instrument 121 may be a bolometer which is operative in the non-visible radiation range such as for infra-red rays, or it may be an optical radiation instrument where the specimen 100 is to be tested at a temperature corresponding to one which emits visible radiations. Thus, such an instrument 121 may be connected to transducers or automatic controllers so that the output thereof can be used to indicate or control responsive means to correct any deviation from the desired temperature level sensed by the indicator 121.

While this invention has been described in connection with creep and rupture testing, it is clear that it may also be utilized in tension tests and for test mechanism for fatigue, bend or compression stress tests. Further, apparatus made in accordance with this invention may be used in connection with the test of materials to be subject to supersonic speeds in wind tunnels, for example; and to test specimens of metal including weld metal and other materials. Moreover, while the foregoing description dealt with a specimen, the material of which increased in resistance as its temperature went up, the principle of my invention is fully applicable to electrically conductive materials in which the resistance goes down as the temperature rises. Various changes in the elements of the illustrated embodiments and other embodiments may be provided without departing from the spirit of my invention or the scope of the appended claims.

I claim:

1. In a temperature control system for specimen testing, apparatus comprising, in combination, a voltage selector, a transformer circuit having a primary winding connected to said selector and a secondary winding in said transformer, a flux path in said transformer, an electrically conductive specimen connected in the circuit across both said windings, and means to vary the permeability of said flux path to control the current passing through said specimen.

2. In a temperature control system for specimen testing, apparatus comprising, in combination, a transformer having a primary winding, means at least initially for impressing a selected voltage across said primary winding, a secondary winding in said transformer, a magnetic core in said transformer extending along at least part of the flux path of said windings, an electrically conductive specimen connected across both said windings, means to impress a direct current field upon said core, and means to vary said field impressed upon said core to control the temperature of said specimen.

3. In a temperature control system for specimen testing, apparatus comprising, in combination, a variable voltage selector coil, a step-down transformer having a primary winding across which a selected voltage provided by said selector is substantially impressed, a secondary winding in said transformer, switch mechanism for adjusting the number of turns in said secondary winding to a predetermined value, a magnetic core for said windings, an electrically conductive specimen connected across said primary winding and across said secondary winding in accordance with the setting of said switch mechanism, a direct current coil for said core, means to provide a selected direct current field for said coil, and means to vary said direct current field in response to variations in the amount of current passing through said specimen.

4. In a temperature control system for specimen testing, apparatus comprising, in combination, a variable voltage selector coil, a step-down transformer having a primary winding across which the selected voltage provided by said selector is substantially impressed, a secondary winding in said transformer, a tap changer for adjusting the number of turns in said secondary winding corresponding to a selected temperature value, a magnetic core for said windings, a common pair of conductors, an electrically conductive specimen connected by said common pair of conductors across said primary winding and across said secondary winding in accordance with the setting of said tap changer, a direct current coil for said core, means to provide a selected direct current field for said coil, means to vary said direct current field in response to variations in the amount of current passing through said specimen, and an instrument responsive to radiation from said specimen to regulate further the amount of direct current passing through said coil.

References Cited in the file of this patent

UNITED STATES PATENTS

| | | |
|---|---|---|
| 2,375,034 | Semchyshen | May 1, 1945 |
| 2,685,195 | Streblow | Aug. 3, 1954 |
| 2,748,597 | Kooistra | June 5, 1956 |
| 2,752,473 | Hage | June 26, 1956 |
| 2,769,076 | Bogdan | Oct. 30, 1956 |
| 2,857,501 | Nitsche | Oct. 21, 1958 |